(12) United States Patent
O'Donnell

(10) Patent No.: US 7,301,691 B2
(45) Date of Patent: Nov. 27, 2007

(54) SYSTEM AND METHOD FOR GENERATING IMAGES

(75) Inventor: Eugene Murphy O'Donnell, Fishers, IN (US)

(73) Assignee: TTE Technology, Inc., Indianapolis, IN (US)

( * ) Notice: Subject to any disclaimer, the term of this patent is extended or adjusted under 35 U.S.C. 154(b) by 309 days.

(21) Appl. No.: 11/201,513

(22) Filed: Aug. 10, 2005

(65) Prior Publication Data

US 2007/0035806 A1 Feb. 15, 2007

(51) Int. Cl.
G02B 26/00 (2006.01)
G03B 21/00 (2006.01)
G03B 21/14 (2006.01)
G03B 21/26 (2006.01)
G03B 21/28 (2006.01)

(52) U.S. Cl. .......................... 359/291; 353/30; 353/31; 353/32; 353/46; 353/69; 353/84; 353/99; 353/101; 348/771; 348/747

(58) Field of Classification Search ................ 359/290, 359/291, 298, 214, 223, 224, 822; 353/20, 353/30–34, 37, 38, 46, 69, 84, 85, 98, 99, 353/101, 102; 348/115, 747, 770, 771, E5.137, 348/E5.139, E5.142, E9.025, E9.027, E13.014; 382/154; 355/53; 362/268, 309, 317, 551; 345/6, 104, 419; 434/285

See application file for complete search history.

(56) References Cited

U.S. PATENT DOCUMENTS 5,479,225 A * 12/1995 Kuga .......................... 353/101
5,564,811 A * 10/1996 Lim ............................ 353/99
6,122,108 A 9/2000 Tholl et al.
6,657,603 B1 12/2003 Demetrescu et al.
6,709,113 B2 * 3/2004 Segler et al. .................. 353/69
6,905,215 B2 * 6/2005 Segler et al. .................. 353/69
7,182,463 B2 * 2/2007 Conner et al. ................ 353/31
7,237,903 B2 * 7/2007 Nagayoshi .................... 353/30
2002/0008812 A1 1/2002 Conner et al.

(Continued)

FOREIGN PATENT DOCUMENTS

EP 1001306 5/2000

(Continued)

OTHER PUBLICATIONS

W. Allen; 47.4: Invited Paper: Wobulation: Doubling the Addressed Resolution of Projection Displays; Digital Projection and Imaging, Hewlett-Packard, Corvallis, Oregon, USA; HP Labs, Cambridge, Massachusetts, USA; 1514 SID 05 Digest.

(Continued)

Primary Examiner—Loha Ben
(74) Attorney, Agent, or Firm—Fletcher Yoder

(57) ABSTRACT

The disclosed embodiments relate to a system and method for generating images. There is provided a method comprising directing light through a projecting lens (28) at a first pixel position (60*a*) on a screen (32), and shifting the projecting lens (28) such that the light is directed on at a second pixel position (66) on the screen (32), wherein the second pixel position (66) is diagonally offset from the first pixel position (60*a*).

20 Claims, 3 Drawing Sheets

U.S. PATENT DOCUMENTS

2007/0091274 A1* 4/2007 Conner et al. ................. 353/31
2007/0109502 A1* 5/2007 Willis et al. .................. 353/32

FOREIGN PATENT DOCUMENTS

| EP | 1388838 | 2/2004 |
| EP | 1524862 | 4/2005 |

OTHER PUBLICATIONS

K. Fujita; Full-color QXGA Projection Display with VA-FLC REsolution-enhancing Device: Photonics R&D Center, Research and Development Group, Ricoh Company, LTD. 16-1 Shinel-cho, Tsuzuki-ku, Yokohama, Kanagawa 224-0035, Japan.

T. Tokita, H. Sugimoto, Y. Matsuki, I. Katoh, K. Kameyama, and Y. Takiguchi, P-108: FLC Resolution-Enhancing Device for Projection Displays, SID 02 Digest, pp. 638-641.

* cited by examiner

SYSTEM AND METHOD FOR GENERATING IMAGES

FIELD OF THE INVENTION

The present invention relates generally to generating images. More specifically, the present invention relates to a system and a method for increasing the resolution of generated images.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Projection systems create video images by varying the color and shade of projected light. One example of a projection system is a Digital Light Processing ("DLP") system. DLP systems employ an optical semiconductor, known as a Digital Micromirror Device ("DMD") to project video onto a screen. DMDs typically contain an array of at least one-half million or more microscopic mirrors mounted on microscopic hinges. Each of these mirrors is associated with a point on the screen, known as a pixel. By varying the amount of light that is reflected off each of these mirrors, it is possible to project video images onto the screen.

Electrically actuating each of these hinge-mounted microscopic mirrors, it is possible to either illuminate a point on the screen (i.e., "turn on" a particular micromirror) or to leave that particular point dark by reflecting the light somewhere else besides the screen (i.e., "turn off" the micromirror). Further, by varying the amount of time a particular micromirror is turned on, it is possible to create a variety of gray shades. For example, if a micromirror is turned on for longer than it is turned off, the pixel that is associated with that particular micromirror will have a light gray color; whereas if a particular micromirror is turned off more frequently than it is turned on, that particular pixel will have a darker gray color. In this manner, video can be created by turning each micromirror on or off several thousand times per second. Moreover, by shining colored light at the micromirrors instead of white light, it is possible to generate millions of shades or color instead of shades of gray.

As technology improves, the demand for high resolution imaging may increase. Currently there are many imaging formats, such as 1080p, 1080i, 720p, 480p or 480i. The resolutions of each of these standards vary. For example, the 1080i standard employs more than two million pixels to display an image. Producing DMDs with sufficient numbers micromirrors to support higher resolution images (e.g., 2 million micromirrors) may be expensive. For this reason, as described in greater detail below, several techniques have been developed to facilitate the display of pixel resolutions in excess of the number of micromirrors on a given DMD.

In a conventional system, the DMD contains an orthogonal grid of micromirrors arranged in rows and columns. The total number of pixels displayed on the screen is the number of rows of micromirrors on the DMD multiplied by the number of columns. (i.e., there is a 1 to 1 correspondence between the number of micromirrors on the DMD and the number of pixels displayed).

However, because the cost of a DMD in a projection system is proportional to the number of micromirrors on the DMD, it is beneficial for a single DMD to display more than one pixel on the screen. One technique for enabling this is to redirect the light reflected from the DMD to more than one point on the display screen. Typically, this is performed by a mechanically actuated projecting lens that can shift between two or more projection positions. For example, the projecting lens may first direct light from one of the micromirrors on the DMD to the display screen at a first pixel position. After the first pixel has been displayed for a given time, the projecting lens may be actuated to shine light from the same DMD micromirror at the second pixel position. The projecting lens alternates rapidly between the two positions to display each respective pixel. The result is a first and a second pixel displayed in separate positions on the display screen.

For example, an actuator may be configured to redirect the light to display the second pixel at a position to the right or left of the first pixel. Similarly, an actuator may also be configured to redirect the light to display a second pixel at a point above or below the first pixel location. Moreover, by adding a second actuator, the projecting lens assembly may be able to shift in both the horizontal and vertical directions. In other words, using two actuators allows a single micromirror on the DMD to display additional pixels in both the horizontal and vertical directions, doubling the resolution possible from a single actuator. However, the addition of a second actuator is more expensive than a single actuator system. Increasing the display resolution from a single actuator is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for generating images. An image display unit may comprise a digital micromirror device configured to direct light through a projecting lens at a first pixel position on a screen, and a projecting lens assembly configured to shift the projecting lens such that the light is directed at a second pixel position on the screen, wherein the second pixel position is diagonally offset from the first pixel position.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
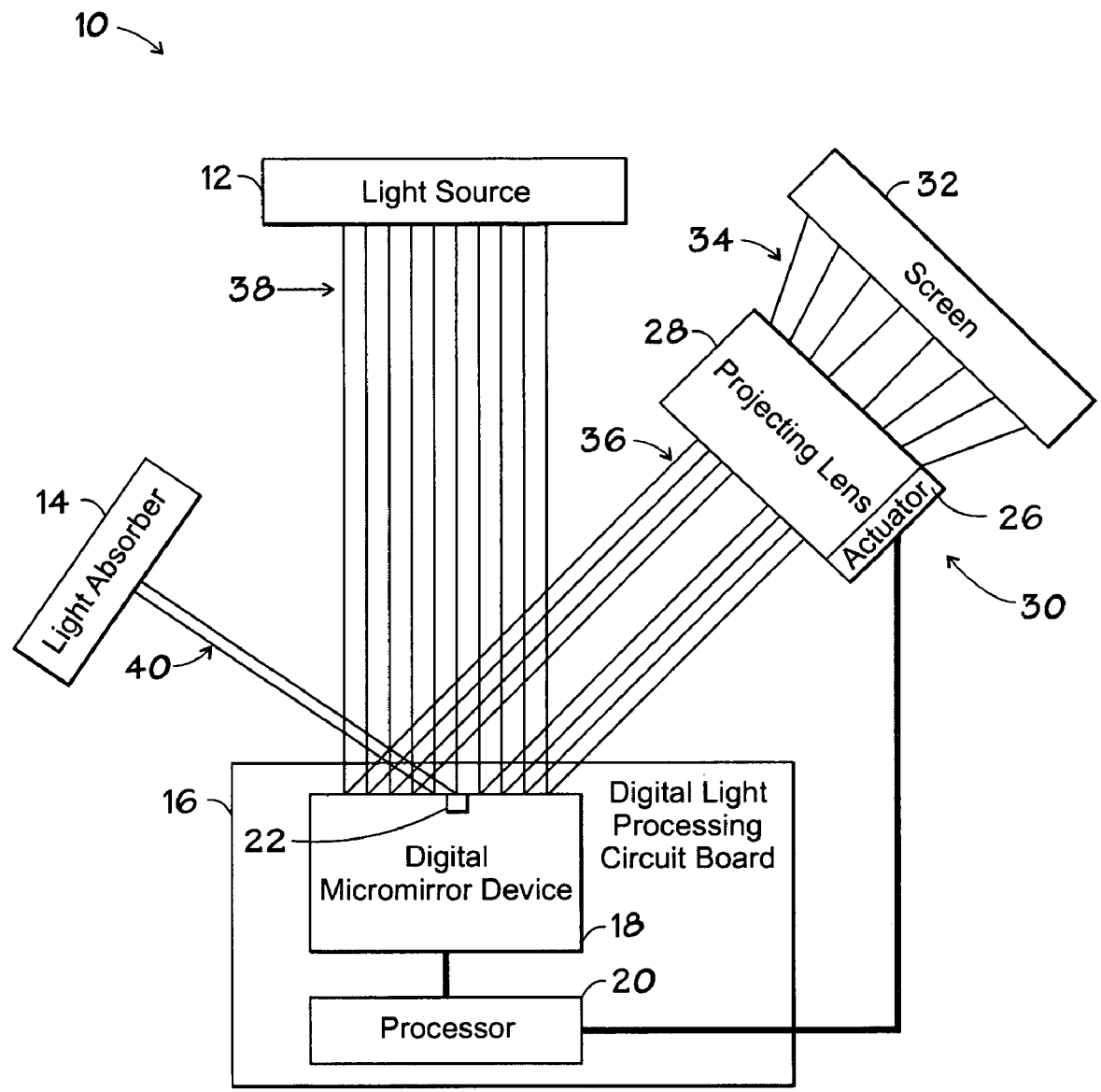
FIG. 1 is a block diagram of an image display unit in accordance with embodiments of the present invention.

Turning initially to FIG. 1, a block diagram of an image display unit configured to display an image in accordance with one embodiment is illustrated and generally designated by a reference numeral 10. In one embodiment, the image display unit 10 may include a Digital Light Processing ("DLP") projection television. In another embodiment, the image display unit 10 may include another form of projection television or projection display. In still other embodiments, the principles described below with regard to the image display unit 10 may also be employed in a printer or image-creation system used to create an image.

The image display unit 10 may include a light source 12. The light source 12 may include any suitable form of lamp, bulb, or colored LED's generally configured to project, shine, or direct colored light 38 at a digital micromirror device ("DMD") 18. In one embodiment the light source 12 may include a metal halide lamp, such as an ultra high performance ("UHP") lamp, configured to shine white light through a color wheel, to create the colored light 38. In an alternate embodiment, the light source 12 may include multiple LED's of differing colors capable of projecting colored light 38.

As illustrated, the light source 12 projects, shines, or directs colored light 38 at the DMD 18. The DMD 18 may be located on a digital light processing ("DLP") circuit board 16 arrayed within an optical line of sight of the light source 12. The DLP circuit board 16 may comprise the DMD 18 and a processor 20. As described above, the DMD 18 may comprise up to one-half million or more micromirrors 22 mounted on microscopic, electrically-actuated hinges that enable the micromirrors 22 to tilt between a turned on position and turned off position.

The DMD 18 may be communicatively coupled to the processor 20. In one embodiment, the processor 20 receives a video input and directs the micromirrors on the DMD 18 to turn to on or off, as appropriate to create the video image. In alternate embodiments the processor 20 may be located elsewhere in the image display unit 10. The processor 20 may be communicatively coupled to the projecting lens assembly 30, so that the processor 20 may synchronize the operation of the projecting lens assembly 30 with the operation of the DMD 18. Additionally, the processor 20 may also be configured to detect the format of an incoming image, and to coordinate the actions of the DMD 18 and the projecting lens assembly 30 accordingly, as described further below.

Returning to the DMD 18, the colored light 38 that reflects off of the micromirror (22) in a turned off position (identified by a reference numeral 40) is directed somewhere in the image display unit 10 besides the screen 32, such as a light absorber 14. As such, the pixel position on the screen 32 that corresponds to a turned off micromirror 22 does not receive the projected colored light 38 while the micromirror 22 is turned off. On the other hand, the colored light 38 that reflects off of the micromirror 22 in a turned on position (identified by a reference numeral 36) is reflected to the projecting lens assembly 30 and then projected to a pixel position on the screen 32.

The projecting lens assembly 30 may include the projecting lens 28 that redirects the reflected light 36 onto the screen 32. In one embodiment, the projecting lens 28 may include a folded mirror. The projecting lens 28 may also be coupled to an actuator 26 capable of shifting the projecting lens 28 about an axis. As described above, the processor 20 may coordinate and/or control this actuator shifting.

Figure 2:
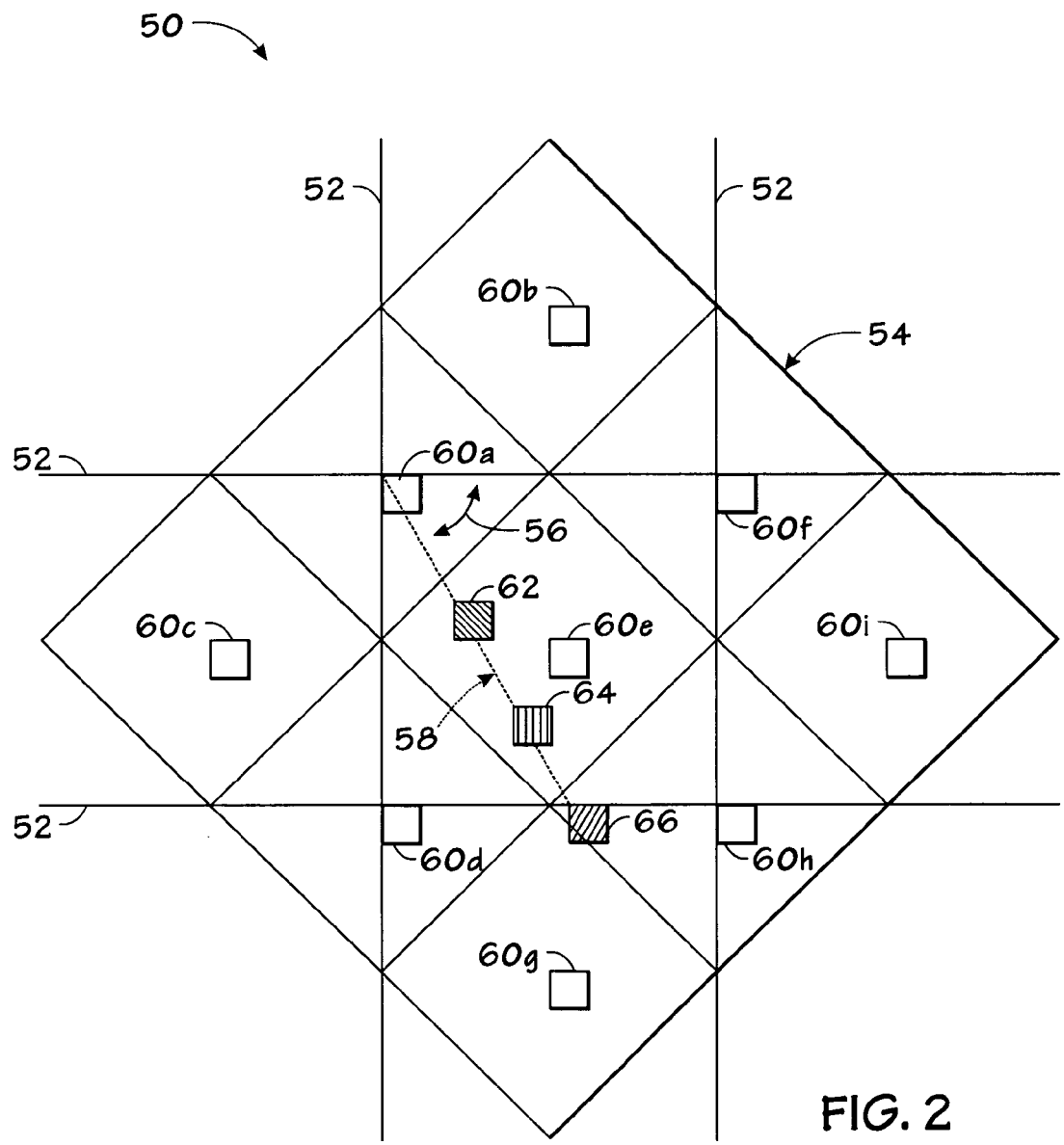
FIG. 2 is a diagram of a pixel array pattern in accordance with embodiments of the present invention.

Turning next to FIG. 2, a diagram of a pixel display pattern 50 relative to the DMD 18 and the screen 32 in accordance with one embodiment is illustrated. FIG. 2 includes an orthogonal grid 52 indicating a horizontal and vertical layout of pixel columns and pixel rows on a display. Further, a rotated grid 54 may represent a subset of the respective rows and columns of micromirrors 22 located on the DMD 18. As discussed previously, the colored light 38 that reflects off of the micromirror 22 in a turned on position (identified by a reference numeral 36) may reflect to the projecting lens assembly 30 before being projected on to the screen 32 for viewing as a pixel. The points 60a-60i may represent pixels on the screen 32, created when the reflected light 36 is redirected by the DMD 18 and directed by the projecting lens assembly 30 in a first position.

As described above, however, the projecting lens assembly may redirect the reflected light 36 to multiple positions on the screen 32. As discussed previously, the projecting lens assembly 30 may include a single actuator 26 that shifts the projecting lens 28 about an axis. As the projecting lens 28 moves, the beam of reflected light 36 may be shifted to a second pixel on the screen 32. The second pixel may be displayed on the screen 32 wherein the second pixel is at a position offset from the first pixel position 60a by an offset angle 56. For example, the second pixel may be displayed at a position 62, 64, or 66.

Configuring the projecting lens assembly 30 to diagonally redirect light to multiple positions on the screen 32 allows multiple pixels to be displayed from a single micromirror 22. For example, to create a first pixel, the projecting lens assembly 30 may remain in its first position, wherein the reflected light 36 is projected such that the pixel projected onto the screen in the first pixel position 60a. To supply a second pixel, the projecting lens 28 may be actuated along a single axis to diagonally shift the reflected light 36 to a second pixel position 66, wherein the second pixel position is diagonally offset from the first pixel position 60a. Accordingly, the second pixel may be displayed on the screen 32 in a different row and different column from the first pixel. In one embodiment, the projecting lens assembly 30 may be configured to shift the pixel location along a diagonal path 58 with a pixel spacing of 1.7 times the pixel pitch and the offset angle 56 of 63.43 degrees. It will be appreciated however, that the pixel positions indicated in FIG. 2 are exemplary, and that in alternate embodiments, different offset angles 56 and/or pixel pitches may be employed.

Figure 3:
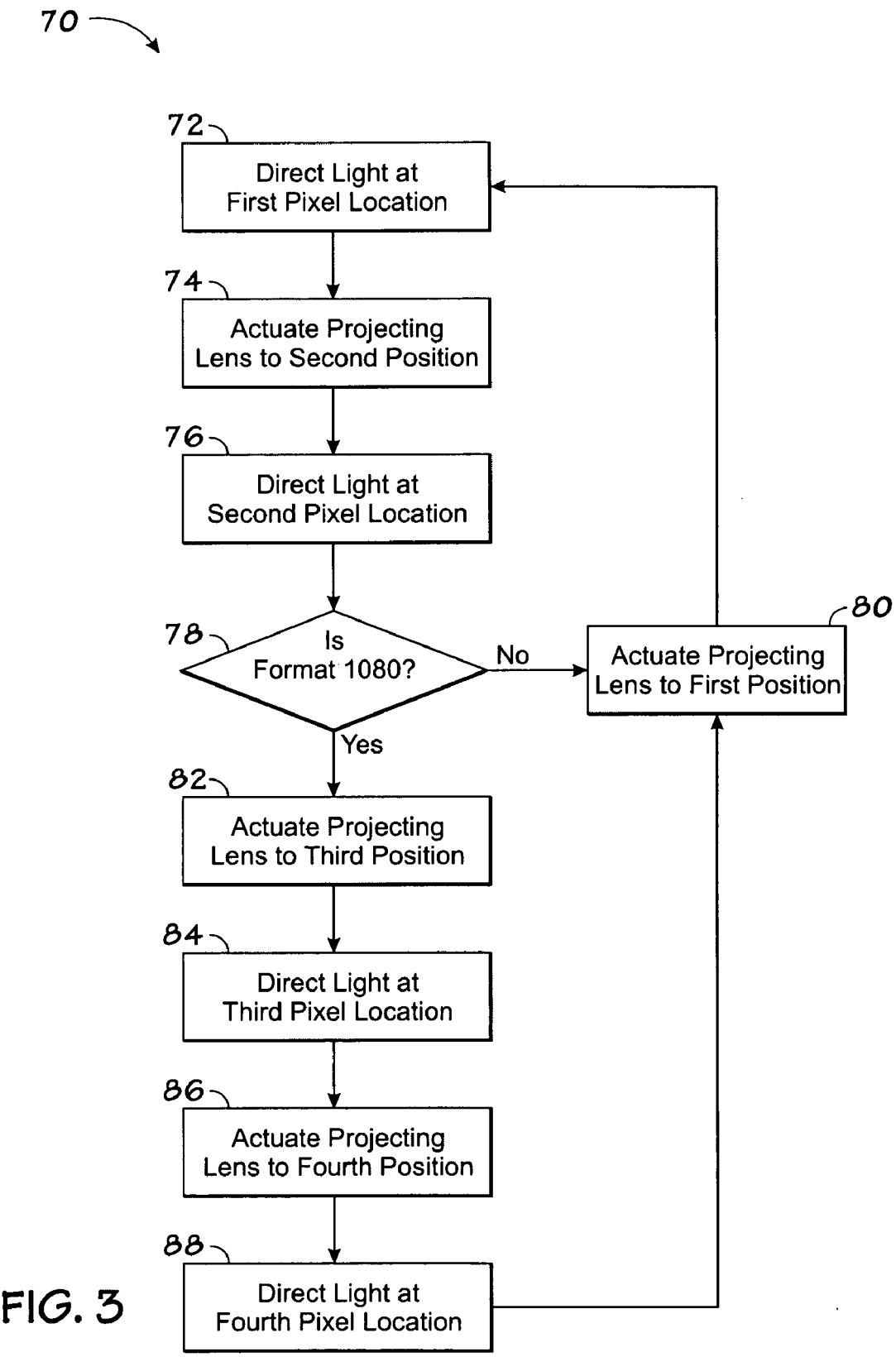
FIG. 3 is a flow chart illustrating an exemplary technique for generating images in accordance with embodiments of the present invention.

In one exemplary embodiment, the DMD 18 may be configured to display multiple HDTV image formats (e.g., 720p and 1080i). Accordingly, FIG. 3 is a flow chart illustrating an exemplary technique 70 for generating images 720p or 1080i images in accordance with embodiments. The technique 70 may be performed by the display unit 10. As indicated by block 72, the technique 70 may begin with the video unit 10 directing a beam of the reflected light 36 at a first pixel location 60a on the screen 32. Next, the projecting lens assembly may actuate the projecting lens 28 to a second position, such that the beam of reflected light 36 (if shined) would be diagonally shifted from the first pixel location 60a to a second pixel location 66, as indicated by block 74. Once the projecting lens has been actuated, the display unit 10 may direct light at the second pixel location 66, as illustrated by block 76.

After directing light at the second pixel location, the processor 20 may determine whether the display format is 1080i, as indicated by block 78. If the display format is not 1080i (i.e., it is 720p in this exemplary embodiment), the projecting lens assembly 30 may actuate the projecting lens 28 back to the first position and cycle back to block 72, as indicated by block 80. If, on the other hand, the display format is 1080, the projecting lens assembly 30 may actuate the projecting lens 28 to a third position such that the beam of reflected light 36 (if shined) would be diagonally shifted from the first and second pixel locations 60a and 66, as shown by block 82. Once the projecting lens has been actuated, the display unit 10 may direct light at the third pixel location 62, as illustrated by block 84. Similarly, the projecting lens assembly may next actuate the projecting lens 28 to a fourth position such that the beam of reflected light 36 (if shined) would be diagonally shifted from the first, second, and third pixel locations 60a, 66, and 62 (block 86), and then the display unit 10 may direct light at the fourth pixel location 64. Lastly, the projecting lens assembly 30 may actuate the projecting lens 28 back to the first position and cycle back to block 72, as indicated by block 80.

It will be appreciated that the technique 70 is merely one exemplary technique for generating images. As such, in alternate embodiments, the pixel locations or progression may be changed. For example, in one alternate embodiment, the video unit 10 may be configured to employ pixel locations 60a, 62, 64, and 66 in that order for 1080i and pixel locations 60a and 66 for 720p.

The techniques described above may enable the image display unit 10 to display multiple video formats (e.g., 1080i, 720p, 480i, and the like). In one embodiment, the processor 20 may interpret the image format of an image received by the image display unit 10. The processor 20 may then synchronize the operation of the DMD 18 and the projecting lens assembly 30 to generate a full resolution image using the above-mentioned techniques. When video is received, the processor 20 may interpret the incoming format and automatically synchronize the DMD 18 and the projecting lens assembly 30, if the video format of a received image has more pixels to be displayed than there are micromirrors 22 on the DMD 18.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising:
directing light through a projecting lens (28) at a first pixel position (60a) on a screen (32); and
shifting the projecting lens (28) such that the light is directed at a second pixel position (66) on the screen (32), wherein the second pixel position (66) is diagonally offset from the first pixel position (60a).

2. The method of claim 1, wherein shifting the projecting lens (28) comprises actuating an actuator (26).

3. The method of claim 1, wherein shifting the projecting lens (28) comprises shifting the projecting lens (28) to direct light at a second pixel position (66) that is offset from the first pixel position by an offset angle (56) of approximately 63 degrees.

4. The method of claim 1, wherein shifting the projecting lens (28) comprises shifting the projecting lens (28), such that the spacing between the first pixel position (60a) and the second pixel position (66) is approximately 1.7 times a pixel pitch of the first pixel.

5. The method of claim 1, comprising shifting the projecting lens (28) to direct light a third pixel position (62), wherein the third pixel position (62) is diagonal offset from the first pixel position (60a).

6. The method of claim 5, comprising shifting the projecting lens (28) to direct light at a fourth pixel position (64), wherein the fourth pixel position (64) is diagonally offset from the third pixel position (62).

7. The method of claim 6, wherein shifting the projecting lens (28) to direct light at the fourth pixel position comprises shifting the light approximately 0.4 times a pitch of the first pixel.

8. An image display unit (10), comprising:
a digital micromirror device (18) configured to direct light through a projecting lens (28) at a first pixel position (60a) on a screen (32); and
a projecting lens assembly (30) configured to shift the projecting lens (28) such that the light is directed at a second pixel position (66) on the screen (32), wherein the second pixel position (66) is diagonally offset from the first pixel position (60a).

9. The image display unit (10) of claim 8, wherein the projecting lens assembly comprises an actuator (26) configured to actuate the projecting lens assembly (30) to shift the projecting lens (28).

10. The image display unit (10) claim 8, wherein the projecting lens assembly (30) is configured to shift the projecting lens (28) such that the second pixel position (66) is along a path (58) that intersects the first pixel position (60a) and the second pixel position (66) is diagonal from an orthogonal grid (52) by an offset angle (56).

11. The image display unit (10) of claim 8, wherein the projecting lens assembly (30) is configured to shift pixel positions at an offset angle (56) of approximately 63 degrees.

12. The image display unit (10) of claim 8, wherein the projecting lens assembly (30) is configured to shift pixel positions at a spacing between the first pixel position (60a) and the second pixel position (66), wherein the spacing is approximately 1.7 times the pixel pitch.

13. The image display unit (10) of claim 8, wherein the projecting lens assembly (30) is configured to shift pixel positions at a spacing between the first pixel position (60a) and the second pixel position (66), wherein the spacing is approximately 0.4 times the pixel pitch.

14. The image display unit (10) of claim 8, further comprising a processor (20) coupled to the digital micromirror device (18) and the projecting lens assembly (30), wherein the processor (20) is configured to interpret an incoming video format and to synchronize the digital micromirror device (18) and the projecting lens assembly (30) to display the incoming video format.

15. An image display unit (10), comprising:
means for directing light through a projecting lens (28) at a first pixel position (60a) on a screen (32); and means for shifting the projecting lens (28) such that the light is directed on at a second pixel position (66) on the screen (32), wherein the second pixel position (66) is diagonally offset from the first pixel position (60*a*).

16. The image display unit (10) of claim 15, wherein the means for shifting the projecting lens (28) comprises means for shifting the projecting lens (28) such that the second pixel position (66) is along a path (58) that intersects the first pixel position (60*a*) and that is diagonally offset from an orthogonal grid (52).

17. The image display unit (10) of claim 15, wherein the means for shifting comprises means for shifting pixel positions on the screen (32) at an offset angle (56) of approximately 63 degrees.

18. The image display unit (10) of claim 15, further comprising means for shifting pixel positions on the screen (32), wherein the spacing between the first pixel position (60*a*) and the second pixel position (66) is approximately 1.7 times a pixel pitch.

19. The image display unit (10) of claim 15, further comprising means for shifting the projecting lens (28) to direct the light at a third pixel position (62), wherein the third pixel position (62) is diagonally offset from the first pixel position (60*a*).

20. The image display unit (10) of claim 15, further comprising means for shifting the projecting lens (28) to direct the light at a fourth pixel position (64), wherein the fourth pixel position (64) is diagonally offset from the first pixel position (60*a*).

* * * * *